United States Patent [19]

Toyama et al.

[11] 3,950,185

[45] Apr. 13, 1976

[54] FILM REMOVING COMPOSITIONS

[75] Inventors: Mitsuo Toyama; Toshio Ito, both of Tokyo; Eiji Kobayashi, Higashikurume; Hideo Kosaka, Sayama, all of Japan

[73] Assignee: Nichiban Co., Ltd., Tokyo, Japan

[22] Filed: May 7, 1974

[21] Appl. No.: 467,841

[30] Foreign Application Priority Data

May 12, 1973 Japan................................ 48-52151

[52] U.S. Cl. ..................... 134/38; 134/4; 252/171; 252/DIG. 8
[51] Int. Cl.² .......................................... B08B 7/04
[58] Field of Search.......... 252/172, DIG. 8, DIG. 3, 252/171, 170; 134/34, 38, 4

[56] References Cited
UNITED STATES PATENTS

| | | | |
|---|---|---|---|
| 1,573,537 | 2/1926 | Blenio............................ | 252/DIG. 8 |
| 1,657,323 | 1/1928 | Simon............................ | 252/DIG. 8 |
| 2,692,245 | 10/1954 | Groves et al................ | 260/29.7 UA |
| 3,149,364 | 9/1964 | Baptist et al.............................. | 134/4 |
| 3,196,027 | 7/1965 | White et al. ..................... | 106/287 C |
| 3,360,472 | 12/1967 | Renold................................ | 252/170 |
| 3,723,330 | 3/1973 | Sheflin............................ | 252/DIG. 8 |

*Primary Examiner*—William E. Schulz
*Attorney, Agent, or Firm*—Haseltine, Lake & Waters

[57] ABSTRACT

A film removing composition consisting essentially of at least one halogenated hydrocarbon solvent as a major solvent and a pressure-sensitive adhesive component such as synthetic resins, and mixtures of natural rubber or synthetic rubbers and tackifiers.

When the film removing composition is applied to a paint film to be removed, and a paper or cloth is put on the film removing composition and then peeled off, the paint film can be removed together with the paper or cloth.

4 Claims, No Drawings

FILM REMOVING COMPOSITIONS

BACKGROUND OF THE INVENTION

This invention relates to a flim removing composition suitable for a wide variety of paint films.

This invention also relates to a process for removing paint films.

Heretofore there have been proposed many removing compositions used to remove paint films and the like. And, the film removing compositions comprising, as a major solvent, halogenated hydrocarbons such as methylene chloride, are used most widely as excellent removing composition because of their excellent ability to penetrate into, dissolve and swell the paint films.

For instance, a methylene chloride film removing composition is prepared from a major amount of methylene chloride and a relatively small amount each of cosolvent such as methanol, a removing promoter such as the amines, an evaporation retarder such as paraffin wax, and a viscosity increasing agent such as methyl cellulose, and is stored in a can or bottle. The removing composition is applied to a film to be removed by brushing, spraying and the like, and allowed to stand for a while, and then the resulting swollen film is scraped off with a trowel or scraper, and the surface from which the film has been removed is washed with water to remove the strain of paraffin wax. Thus, this removing operation cannot always be considered convenient, and there are many disadvantages in the operation that, when the film is scrapped off with a trowel or the like, the remaining methylene chloride or the like stick to the fingers and give the skin an irritation (painful itch) and cause the skin to chap.

Accordingly, it will be highly evaluated to obtain a film removing composition to eliminate the troubles inherent in the conventional film removing compositions.

SUMMARY OF THE INVENTION

An object of this invention is to provide a film removing composition with which paint films can be easily removed by a very simple removing process.

Another object of this invention is to provide an improved process for removing films.

Other objects and a full understanding of the invention may be had by referring to the following description and claims.

The film removing composition of this invention consists essentially of at least one halogenated hydrocarbon solvent as a major solvent, and a pressure-sensitive adhesive component such as synthetic resins, and mixtures of natural rubber or synthetic rubbers and tackifiers. The film removing composition of this invention contains 5 to 20 g. of adhesive component per 100 ml. of said solvent.

In order to remove paint film from solids having a coating thereon the film removing composition of this invention is applied to the paint film and then a paper or cloth is put on the removing composition at the proper time. The paint film blisters from the surface upon which the paint film was formed, due to the penetrating, swelling and dissolving actions of the removing composition, and becomes easily-removable, and at the same time the paper or cloth is stuck fast through the removing composition film on the paint film. Therefore, when the paper or cloth is peeled off at proper time, the paint film is peeled off together with the paper or cloth and thus can be removed very easily.

DETAILED DESCRIPTION OF THE INVENTION

The film removing composition of this invention contains, at least one halogenated hydrocarbon solvent as a major solvent selected from the group consisting of methylene chloride, chloroform, carbon tetrachloride bromochloromethane, ethylene dichloride, trichloroethylene, tetrachloroethylene, monochlorobenzene, and a mixture. Generally, the lower molecular weight halogenated hydrocarbons, especially methylene chloride, is preferable. However, relatively high molecular weight halogenated aliphatic hydrocarbons and halogenated aromatic hydrocarbons (for instance, monochlorobenzene) may also be used. Generally, these high molecular weight halogenated hydrocarbons are used in combination with the lower molecular weight halogenated hydrocarbons.

The major solvents, halogenated hydrocarbons, exert excellent penetrating, swellng and dissolving actions on various paint films and are very effective for facilitating the removal of the paint films. Additionally, the halogenated hydrocarbons are nonflammable and thus have an advantage that they are less limited with respect to the field and method of the application than inflammable solvents.

In addition to the above major solvents, the film removing composition of this invention may contain a small amount of additional solvents. Exemplary of such solvents are the hydrocarbons, alcohols, ketones, esters, etc., the lower aliphatic alcohols such as methanol being most preferable.

Further, the film removing composition of this invention may contain various other constituents such as removing promoter, for instance, ammonia, various kinds of amines and acids, various kinds of surface active agents and evaporation retarder (for instance, paraffin wax). These additional constituents are commonly used for conventional film removing compositions, so that the details are omitted.

The film removing compositions which contain the above major solvents, additional solvents, removing promoters and various other additives are not novel in themselves. The most characteristic constituent of the film removing composition of thie invention is a pressure-sensitive adhesive component. That is, the film removing composition of this invention is quite different from the conventional film removing compositions in that the film removing composition of this invention contains a pressure-sensitive adhesive component sufficient in quantity and quality to stick fast a paper or cloth through the film removing composition on a film to be removed when the paper or cloth is put on the film removing composition which was applied to the film to be removed.

The pressure-sensitive adhesive components of the film removing composition of this invention are preferably such adhesives such as are used in the manufacture of conventional adhesive tapes. Exemplary of such pressure-sensitive adhesives are synthetic resins such as acrylic copolymers, for instance, copolymers of acrylic esters containing from 4 to 12 carbon atoms in the alkyl group thereof (e.g. butyl acrylate-2-ethylhexyl acrylate copolymer), copolymers of said acrylic copolymer with vinyl acetate, acrylic acid, acrylamide, etc., polyvinyl ether, and the mixtures of elastomer such as natural rubber, synthetic rubbers (e.g., cis-1,4-isoprene rubber, chloroprene rubber, styrene-budadiene block-copolymer, styrene-butadiene random copolymer, styrene-isoprene block-copolymer, butadiene rubber, butyl rubber, etc.), reclaimed rubber, etc., and tackifier such as terpene resin, rosin, hydrogenated rosins and the derivatives thereof, coumarone resin, indene resin, petroleum resin such as "Piccopale" (brand name for a thermoplastic hydrocarbon resin manufactured by Picco Co., produced by the polymerization of ethylenic hydrocarbons derived from the deep cracking of petroleum and having a molecular weight in the range of 800 to 1500), etc.

It is also known to add viscosity increasing agent such as methyl cellulose, sodium carboxymethyl cellulose and the like to a film removing composition (see, for instance, Japanese Patent Publications Nos. 6386/61 and No. 22746/65). However, these viscosity increasing agents are added to make the film removing composition adequately viscous, thereby preventing the removing composition which was applied to the vertical surfaces from running down. When the conventional film removing composition containing the above viscosity increasing agents is applied to the film to be removed, and then a paper or cloth is put thereon, it is impossible to stick fast the paper or cloth on the film to be removed. Therefore, it is impossible to remove effectively the paint film, even when a removing process as disclosed by this invention is applied to such conventional removing composition.

The process for removing films with the film removing composition of this invention is given more in detail below.

The films to which the film removing composition of this invention is applied are various paint films, adhesive coatings and the like which were applied to woods, metals, glasses and various other objects. When the film removing composition of this invention is applied by brushing, spraying and the like to these films to be removed, the films blister due to the penetrating, swelling and dissolving actions of the removing composition on the films, and at the same time a thin layer of adhesive is formed on the surface of the removing composition coating. When a paper or cloth is put on the removing composition coating at proper time, the paper or cloth is stuck fast through the layer of the adhesive on the films, and therefore, when the paper or cloth is peeled off, the film can be removed easily together with the paper or cloth. Moreover, since the removed films are stuck fast on the paper or cloth, it is very easy to treat (dispose of) the removed films. The removing operation can be effected most economically by using properly papers of from low strength such as newspaper, to high strength such as kraft paper, and cloths of very high strength.

As described above, the use of the film removing composition of this invention saves such troubles as encountered in the case to scrape off the film with a trowel, scraper and the like, and avoids the danger that the removing composition sticks to the fingers and the like to hurt the skin, and also makes its very easy to treat the removed film. Additionally, a thin layer of the adhesive is formed rapidly on the removing composition coating to prevent the solvents such as halogenated hydrocarbons from volatilizing and evaporating, and, since a long spell of removing operation such as scraping off is not required at all, the surface of the object from which the film is to be removed is safe from damage by a trowel, and troubles caused by toxic solvents are comparatively lessened. Moreover, since it is not always necessary, unlike the conventional removing compositions, to add evaporation retarder (for instance, paraffin wax) and viscosity increasing agent (methyl cellulose, etc.), washing with water the surface exposed after removing the film can be omitted or simplified by the use of the removing composition without such additives.

The film usually can be removed by applying one coat of the film removing composition of the present invention and one removing operation. Where the film is very hard to remove by applying one coat and one removing operation, the film can be removed by applying two or three coats. And, where a part of the film is left unremoved, it can be removed easily by pasting immediately a commercially available cellophane adhesive tape, kraft paper adhesive tape and the like thereon and peeling it off. The unremoved film may also be removed by rubbing with a cloth.

Where the film is relatively hard to remove and one wants to make the removing composition act on the film for a long time in order to improve the film removing efficiency, a film of low air permeability such as polyethylene film may be put immediately on the removing composition coating, allowed to stand for a long time (say, 10 to 30 minutes) and then peeled off. After the removing composition coating has been half-dried, a paper or cloth is put thereon, and the film can be removed together with the paper or cloth. Some paint films of course can be removed without the necessity of applying plastic film such as mentioned above after the removing composition has been allowed to remain on the film for 30 minutes to one hour.

The following examples are given to aid better understanding of this invention, but it should be understood that the invention is by no means limited to those specific examples.

EXAMPLE 1

This example gives a film removing composition which acts especially strong on phthalic resin paints and polyurethane resin paints, and is also effective for the removal of baking acrylic resins, baking melamine resins, epoxy resins and lacquer paints, etc.

The removing composition consists of the following components in the following proportions:

| | |
|---|---|
| Methylene chloride | 90 ml |
| Monochlorobenzene | 10 ml |
| Methanol | 10 ml |
| Natural rubber | 8 g |
| Terpene resin | 4 g |
| Ethylene glycol monoethyl ether | 5 g |
| Monoethylamine | 2 ml |

The film removing composition is prepared by stirring the above mixture to dissolve the adhesive components (natural rubber and terpene resin). The resulting removing composition is stored in an air-tight can, bottle and the like.

When the removing composition is applied to a paint film to be removed, the paint film begins swelling at once. After the paint film has fully swollen (say, after several tens seconds) a newspaper is put on the removing composition coating and pressed lightly. When the newspaper is peeled off carefully after several seconds, the paint film is peeled off together with the newspaper. Since the removing composition does not contain paraffin wax and the like at all, the surface which was exposed after the removal of the paint film can be painted without the necessity of washing with water.

Where the complete removal of the paint film cannot be performed by one removing operation, the removing composition may be applied twice or three times, or an adhesive tape may be used to remove the unremoved part of the film as described hereinbefore.

EXAMPLE 2

This example gives a film removing composition which has an excellent removing action on oil paints, phthalic resin and polyurethane resin paints, and is effective also for the removal of baking acrylic, baking melamine and epoxy resin paints. The film removing composition consists of the following components in the following proportions.

| | |
|---|---|
| Methylene chloride | 80 ml |
| Bromochloromethane | 20 ml |
| Methanol | 10 ml |
| Chloroprene rubber | 4 g |
| Natural rubber | 4 g |
| Hydrogenated rosin glycerol ester | 4 g |
| Morpholine | 2 ml |

The film removing composition is prepared by stirring the above mixture to dissolve the adhesive components (chloroprene rubber, natural rubber and halogenated rosin glycerol ester).

The removing composition is used in the same manner and with the same removing efficiency as in Example 1.

The removing compositions having the same removing efficiency as in Examples 1 and 2 could be obtained even by using, instead of elastomer components (rubber components) and tackifier components in Examples 1 and 2, various other elastomer components and tackifier components which are used in the preparation of ordinary adhesive tapes.

EXAMPLE 3

In this example an acrylic copolymer is used as pressure-sensitive adhesive. The removing composition consists of the following components in the following proportions:

| | |
|---|---|
| Methylene chloride | 80 ml |
| Bromochloromethane | 20 ml |
| Methanol | 10 ml |
| Ethyl acetate | 10 ml |
| Butyl acrylate (85% by weight)-2-ethylhexyl acrylate (15% by weight) copolymer | 15 g |

The removing composition is prepared by stirring the above mixture to dissolve the adhesive component.

The resulting removing composition is also effective for the removal of oil paints and varnish, phthalic resin, polyurethane resin and epoxy resin paints, high solid lacquers, etc.

A film removing composition prepared by using, instead of the above butyl acrylate-2-ethylhexyl acrylate copolymer, a terpolymer made by the polymerization of butyl acrylate and 2-ethylhexyl acrylate with vinyl acetate or acrylic acid had also the same removing efficiency as that of the above removing composition.

EXAMPLE 4

This example gives a removing composition effective for widely used paint films, that is, a wide variety of films such as melamine, acrylic, polyurethane and epoxy resin paints and the baked films thereof.

The removing composition consists of the following components in the following proportions:

| | |
|---|---|
| Methylene chloride | 80 ml |
| Toluene | 10 ml |
| Metanol | 8 ml |
| Natural rubber | 4 g |
| Hydrogenated rosin pentaerythritol ester | 2 g |
| Paraffin wax (softening point: 52–54°C) | 1 g |
| Monoethylamine | 2 ml |
| Surface active agent (sodium dodecyl sulfate) | 0.3 g |

The removing composition is prepared by stirring the above mixture to dissolve the adhesive components (natural rubber and hydrogenated rosin pentaerythritol ester). Paraffin wax is, to advantage, previously dissolved in methylene chloride. However, the removing composition contains a small amount of paraffin to prevent methylene chloride from valtilizing, so a slightly washing with water is necessary where the repainting is done after removing the film.

EXAMPLE 5

This example gives a film removing composition consisting of the following components in the following proportions and fit for the removal of a wide variety of films and baked films. Since the removing composition contains an acid component, the washing with water is necessary after removing the film.

| | |
|---|---|
| Methylene chloride | 80 ml |
| Bromochloromethane | 20 ml |
| Methanol | 9 ml |
| Natural rubber | 4 g |
| Butadiene rubber | 4 g |
| Hydrogenated rosin pentaerythritol ester | 4 g |
| Paraffin wax | 1 g |
| Acetic anhydride | 1 ml |

The removing composition is prepared and used in the same manner as in Example 4.

EXAMPLE 6

A film removing composition consists of the following components in the following proportions and is fit for the removal of the widely used paint films as set forth in Example 4.

| | |
|---|---|
| Methylene chloride | 90 ml |
| Methanol | 10 ml |
| Natural rubber | 8 g |
| Hydrogenated rosin pentaerythritol ester | 3 g |
| Paraffin wax | 1 g |
| Formic acid | 1 ml |

Since the removing composition contains an acid component like that of Example 5, it is unfit for the removal of the film especially on aluminum and galvanized iron plates. Further, it is preferred to wash the surface of such metals with water after removing the film.

What is claimed is:

1. A film removing composition consistng essentially of at least one halogenated hydrocarbon solvent, as a major solvent selected from the group consisting of methylene chloride, chloroform, carbon tetrachloride, bromochloromethane, ethylene dichloride, trichloroethylene, tetrachloroethylene, monochlorobenzene and a mixture thereof, and 5 to 20g of a pressure-sensitive adhesive component per 100 ml of said major solvent.

2. The composition as claimed in claim 1, wherein said pressure-sensitive adhesive component is a mixture of at least one elastomer selected from the group consisting of natural rubber, cis-1,4-isoprene rubber, chloroprene rubber, styrene-butadiene block-copolymer, styrene-butadiene random copolymer, styrene-isoprene block-copolymer, butadiene rubber, butyl rubber and reclaimed rubber, and 10 to 100 weight parts of at least one tackifier selected from the group consisting of terpene resin, rosin, halogenated rosins and the derivatives thereof, coumarone resin, indene resin and petroleum resin per 100 weight parts of said elastomer.

3. The composition as claimed in claim 1, wherein said pressure-sensitive adhesive component is selected from the group consisting of a copolymer of acrylic ester containing from 4 to 12 carbon atoms in the alkyl group thereof, a copolymer of said acrylic ester with vinyl acetate or acrylic acid, and polyvinyl ether.

4. A process for removing paint films from objects having a coating thereon which comprises applying the composition of claim 1 to the paint film, putting a paper or cloth on said composition, thereby sticking fast said paper or cloth on the paint film through said composition, and then peeling off the paper or cloth.

* * * * *